United States Patent
Teich et al.

(10) Patent No.: US 10,425,569 B2
(45) Date of Patent: Sep. 24, 2019

(54) CAMERA SYSTEM

(71) Applicant: FLIR Systems, Inc., Wilsonville, OR (US)

(72) Inventors: Andrew C. Teich, West Linn, OR (US); Patrick B. Richardson, Santa Barbara, CA (US); Nicholas Hogasten, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 15/201,172

(22) Filed: Jul. 1, 2016

(65) Prior Publication Data

US 2016/0316128 A1    Oct. 27, 2016

Related U.S. Application Data (63) Continuation of application No. PCT/US2014/072595, filed on Dec. 29, 2014.
(Continued)

(51) Int. Cl.
*H04N 5/14* (2006.01)
*H04N 5/232* (2006.01)
(Continued)

(52) U.S. Cl.
CPC ......... *H04N 5/23203* (2013.01); *F41G 3/165* (2013.01); *G03B 29/00* (2013.01); *H04N 5/232* (2013.01); *H04N 5/23216* (2013.01); *H04N 5/23241* (2013.01); *H04N 5/33* (2013.01); *H04N 5/77* (2013.01); *G01S 3/7865* (2013.01); *G03B 15/00* (2013.01); *H04N 5/144* (2013.01)

(58) Field of Classification Search
CPC ...... H04N 5/144; H04N 5/23241; H04N 5/33; H04N 5/772; G03B 15/00; G03B 29/00; G02B 23/00; G02B 23/12; G02B 23/125
USPC ........... 348/169; 352/95; 359/906, 399, 405, 359/409; 396/426, 429
See application file for complete search history.

(56) References Cited

U.S. PATENT DOCUMENTS

| 4,835,621 A | * | 5/1989 | Black | F41J 5/10 |
| | | | | 352/95 |
| 2002/0191282 A1 | * | 12/2002 | Edwards | F41G 1/38 |
| | | | | 359/399 |

(Continued)

FOREIGN PATENT DOCUMENTS

| EP | 985899 | 3/2000 | |
| EP | 0985899 A1 | * 3/2000 | ............ G03B 29/00 |
| WO | WO 2012/131548 | 10/2012 | |

*Primary Examiner* — Thai Q Tran
*Assistant Examiner* — Syed Y Hasan
(74) *Attorney, Agent, or Firm* — Haynes and Boone, LLP (57) ABSTRACT

Systems and methods may be provided for operating a camera based the position, orientation, or motion of the camera. A system can include a firearm, a camera mounted to the firearm, a sensor that gathers sensor data associated with at least one of a position, an orientation, or a motion of the firearm, and a processor that receives the sensor data and operates the camera based on the sensor data. The system may be used to capture image data such as video image data in response to a detected ballistic event, to modify the power status of the camera in response to a detected position of the camera, or to operate a display of the camera in response to a non-ballistic motion of the camera.

20 Claims, 7 Drawing Sheets

Related U.S. Application Data

(60) Provisional application No. 61/923,599, filed on Jan. 3, 2014.

(51) Int. Cl.
    *H04N 5/33*     (2006.01)
    *H04N 5/77*     (2006.01)
    *G03B 15/00*     (2006.01)
    *G03B 29/00*     (2006.01)
    *F41G 3/16*     (2006.01)
    *G01S 3/786*     (2006.01)

(56) References Cited

U.S. PATENT DOCUMENTS

| | | | |
|---|---|---|---|
| 2006/0082730 A1* | 4/2006 | Franks | F41A 17/06 352/95 |
| 2008/0112698 A1* | 5/2008 | Ray | G03B 29/00 396/56 |
| 2013/0286215 A1 | 10/2013 | Baylouny et al. | |
| 2014/0028856 A1* | 1/2014 | Ehrlich | F41A 17/08 348/169 |

* cited by examiner

CAMERA SYSTEM

CROSS-REFERENCE TO RELATED APPLICATIONS

This application is a continuation of International Patent Application No. PCT/US2014/072595 filed Dec. 29, 2014 and entitled "CAMERA SYSTEM," which claims priority to and the benefit of U.S. Provisional Patent Application No. 61/923,599 filed Jan. 3, 2014 and entitled "CAMERA SYSTEM," which are all hereby incorporated by reference in their entirety.

TECHNICAL FIELD

One or more embodiments of the invention relate generally to image capture systems and, more particularly, to image capture systems in which sensor based control systems can be provided.

BACKGROUND

There are a wide variety of image detectors, such as visible image detectors, infrared image detectors, or other types of image detectors that may be provided in an image detector array for capturing an image. Imaging components having image detectors can be included in devices such as cameras or mobile phones and are commonly operated to capture images when a user provides image capture input to the device by clicking a real or virtual shutter button or pushing a real or virtual record button for capturing video images.

However, in some situations, it can be undesirable or impossible for the user to devote attention, proper timing, and/or energy to operating the imaging component at the time when an image is to be captured.

It would therefore be desirable to be able to provide improved image capture systems.

SUMMARY

A system may be provided for capturing images such as infrared images. The system may include a camera having an array of image detectors and associated readout circuitry for reading out image signals from the image detectors.

The system may include additional components such as one or more sensors for sensing the position and/or motion of the system. The sensors may include one or more accelerometers, gyroscopes, or other motion or position sensing circuitry. Sensor data from the sensors may be used to operate the camera. For example, the camera may be powered on or off based on the orientation of the system. In another example, the camera can begin and/or end image capture operations such as video image capture operations based on the motion of the system.

According to an embodiment, the system can include a firearm. The camera may be mounted to or otherwise integrated with the firearm. The sensors may gather sensor data that can be used to determine the position, orientation, and or motion of the firearm. The camera may be operated using the sensor data.

According to an embodiment, the sensor data may be used to identify a ballistic event such as the firing of a bullet from the firearm. The sensor data may, for example, be accelerometer data that indicates rapid acceleration of the firearm. The camera may be used to capture video image data before, during, and/or after a ballistic event. For example, the camera may capture video images for a predetermined amount of time whenever a ballistic event occurs.

According to an embodiment, the sensor data may be used to identify non-ballistic motion of the firearm such as a shake, a unidirectional sweep, a bi-directional sweep, a multidirectional sweep, a patterned movement, or other motion of the firearm other than motion caused by the firing of ammunition. In response to detecting a non-ballistic movement, the camera may be operated in a different mode, camera images may be displayed in a different mode, or menu options displayed on a display associated with the camera may be navigated (as examples).

According to an embodiment, the sensor data may be used to determine a position and/or an orientation of the firearm. For example, sensor data such as gyroscope data may be used to determine that the firearm is pointed at the ground and is therefore not in use. In response to determining that the firearm is aimed at the ground, the camera may be turned off or operated in a low power or standby mode. The sensor data may also be used to determine that the firearm has been raised. In response to determining that the firearm has been raised, the camera may be powered on or may be begin capturing still or video images.

The methods and systems disclosed herein can facilitate reduced power camera operations, reduced power camera operations for firearms, hands-free camera operations for firearms and/or recording of events associated with discharging of a firearm.

The invention disclosed herein is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the invention and their advantages are best understood by referring to the detailed description that

DETAILED DESCRIPTION

A system is disclosed having an image sensor and one or more additional sensors for sensing the position, orientation, motion and/or other characteristics of the system. The additional sensors may include one or more accelerometers, one or more gyroscopes, a global positioning system component, a compass, and/or other position, orientation, or motion sensing components. The additional sensors may include a microphone. The image sensor may be included in a camera with a display. The camera and/or the display may be operated based on the position, orientation, and/or motion of the camera.

Figure 1:
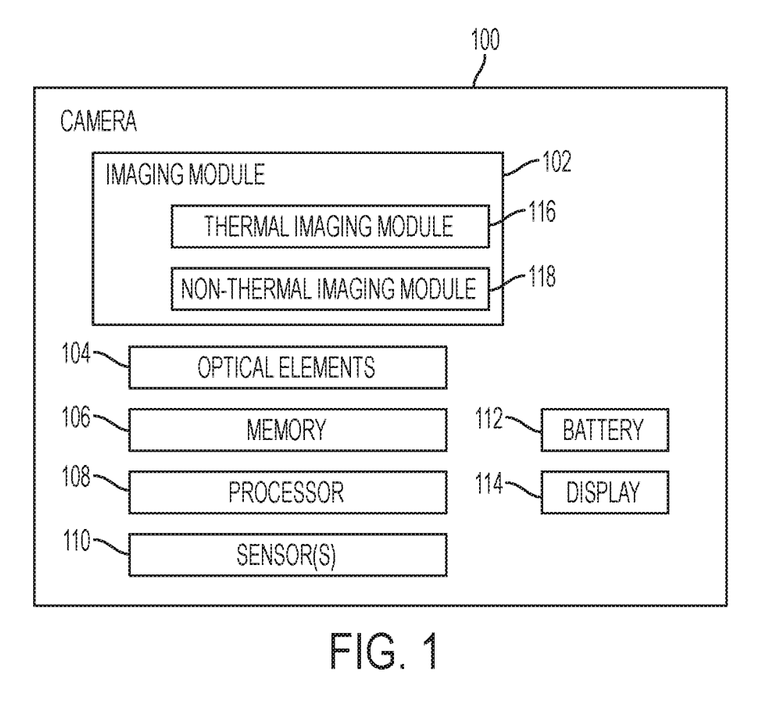
FIG. 1 shows an illustrative block diagram of a camera having one or more sensors that may be used in controlling camera operations, in accordance with an embodiment.

Turning now to the drawings, FIG. 1 illustrates a block diagram of a system (e.g., an imaging system such as a camera) for capturing and processing images in accordance with one or more embodiments. A system such as camera 100 may include, in one implementation, an image capture component such as imaging module 102, one or more optical elements 104, a memory component such as memory 106, a processing component such as processor 108, one or more sensors 110, a battery 112, and/or a display component such as display 114.

Camera 100 may represent, for example, an imaging system such as a visible light imaging device, an infrared imaging device, or a multi-band imaging device for capturing and processing images, such as still images and/or video images. In some embodiments, camera 100 may represent any type of infrared camera adapted to detect infrared radiation and provide representative data and information (e.g., infrared image data of a scene) or may represent more generally any type of electro-optical sensor system. As examples, camera 100 may represent an infrared camera, a dual band imager such as a night vision imager that operates to sense reflected visible and/or short-wave infrared (SWIR) light for high resolution images and long-wave infrared (LWIR) radiation for thermal imaging, or an imager for sensing both short wave and long wave radiation simultaneously for providing independent image information. Camera 100 may comprise a portable device and may be incorporated, e.g., into a firearm, a hand-held device, a vehicle (e.g., an automobile or other type of land-based vehicle, an aircraft, a marine craft, or a spacecraft) or other system requiring infrared images to be stored and/or displayed.

In various embodiments, processor 108 may include any type of a processor or a logic device (e.g., a programmable logic device (PLD) configured to perform processing functions). Processor 108 may be adapted to interface and communicate with components 102, 104, 106, 110, 112, and/or 114 to perform method and processing steps and/or operations for camera 100.

Memory 106 includes, in one embodiment, one or more memory devices adapted to store data and information, including for example image data such as infrared data and information. Memory 106 may include one or more various types of memory devices including volatile and non-volatile memory devices. Processing component 108 may be adapted to execute software stored in memory 106 so as to perform method and process steps and/or operations described herein.

Imaging module 102 may include one or more imaging components for capturing images in response to light of various colors such as thermal imaging module 116 and/or non-thermal imaging module 118. Optical elements 104 may include one or more lenses, mirrors, filters, or other optical elements for focusing or otherwise redirecting light of particular wavelengths onto image sensors of imaging modules 116 and/or 118. Thermal imaging module 116 may be used to capture thermal images such as long wave infrared (LWIR) and/or mid wave infrared wave (MWIR). Non-thermal imaging module 118 may be used to capture non-thermal images such as visible light images and/or short wave infrared (SWIR) images.

Thermal imaging module 116 may, in one embodiment, include one or more image detector elements such as infrared photodetector elements (e.g., any type of multi-pixel infrared detector, such as a focal plane array as described hereinafter) for capturing thermal image data such as infrared image data (e.g., still image data and/or video data) representative of an scene. Thermal imaging module 116 may include an array of strained layer superlattice (SLS) detectors, uncooled detector elements (e.g., uncooled microbolometer sensors), cooled detector elements (e.g., detector elements such as photovoltaic or quantum structure elements that are cooled using a cryogen coupled to the array or using a refrigeration system), InSb detector elements, quantum structure detector elements, InGaAs detector elements, or other types of sensors.

Non-thermal imaging module 118 may, in one embodiment, include one or more image detector elements such as charge-coupled device (CCD) detector elements, complementary metal oxide semiconductor (CMOS) detector elements, or other types of sensors.

In one implementation, imaging module 102 may be configured to generate digital image data representing incoming image light from a scene. Imaging module 102 may include one or more signal processing components such as analog-to-digital converters included as part of an image sensor or separate from the image sensor as part of camera 100.

Display 114 may include, in one embodiment, an image display device (e.g., a liquid crystal display (LCD) or various other types of generally known video displays or monitors). Processor 108 may be adapted to display image data and information such as camera operations menus on the display 114. Processor 108 may be adapted to retrieve image data and information from memory 106 and display any retrieved image data and information on display 114. Display 114 may include display electronics, which may be utilized by processor 108 to display image data and/or other camera operations information (e.g., infrared images and/or menu options). Display 114 may be adapted to receive image data and information directly from imaging module 102 via the processor 108, or the image data and information may be transferred from memory 106 via processing component 108.

Sensors 110 may include, in one embodiment, one or more sensors of various types, depending on the application or implementation requirements, as would be understood by one skilled in the art. Sensors 110 may provide sensor data and/or other information to at least processor 108. In one aspect, processor 108 may be adapted to communicate with one or more sensors 110 (e.g., by receiving sensor data from sensors 110) and with imaging module 102 (e.g., by receiving image data from imaging module 102 and providing and/or receiving command, control, and/or other information to and/or from imaging module 102, sensors 110, and/or one or more other components of camera 100).

In various implementations, sensors 110 may provide information regarding the position, orientation, and/or motion of camera 100. Sensors 110 may include one or more microphones that provide sound data for determining the status of camera 100, one or more accelerometers that provide acceleration data for measuring the acceleration of camera 100, one or more gyroscopes that provide gyroscope data for measuring the position and/or orientation and/or linear changes in the position and/or orientation of the camera, global positioning system components that provide global positioning system (GPS) data for measuring the location of camera 100, a compass that provides compass data for measuring the orientation of camera 100, and/or other sensors. Sensors 110 may include an inertial measurement unit (IMU) (e.g., a packaged integrated circuit having one or more accelerometers, one or more gyroscopes, and/or one or more other sensors) that gathers position data, orientation data, and/or motion data and provides the gathered IMU data to a processor.

Processor 108 may receive sensor data from sensors 110 and, responsive to the received sensor data, operate imaging module 102. For example, processor 108 may be configured to modify the operational state of imaging module 102 to conserve power drawn by imaging module 102 from battery 112 based on the position of camera 100 as determined by sensor data from sensors 110. In another example, processor 108 may initiate image capture, storage, and/or transmission operations and/or modify camera operations information displayed on display 114 based on a detection of camera motion as determined by sensor data from sensors 110. In another example, processor 108 may initiate image capture, storage, and/or transmission operations and/or modify camera operations information displayed on display 114 based on a detection of a sound as determined by sensor data from sensors 110.

In various embodiments, components of camera 100 may be combined and/or implemented or not, as desired or depending on the application or requirements, with camera 100 representing various functional blocks of a related system.

In some embodiments, a camera such as camera 100 may be implemented in a larger system. As an example, camera 100 may be incorporated into a vehicle or a firearm.

Figure 2A:
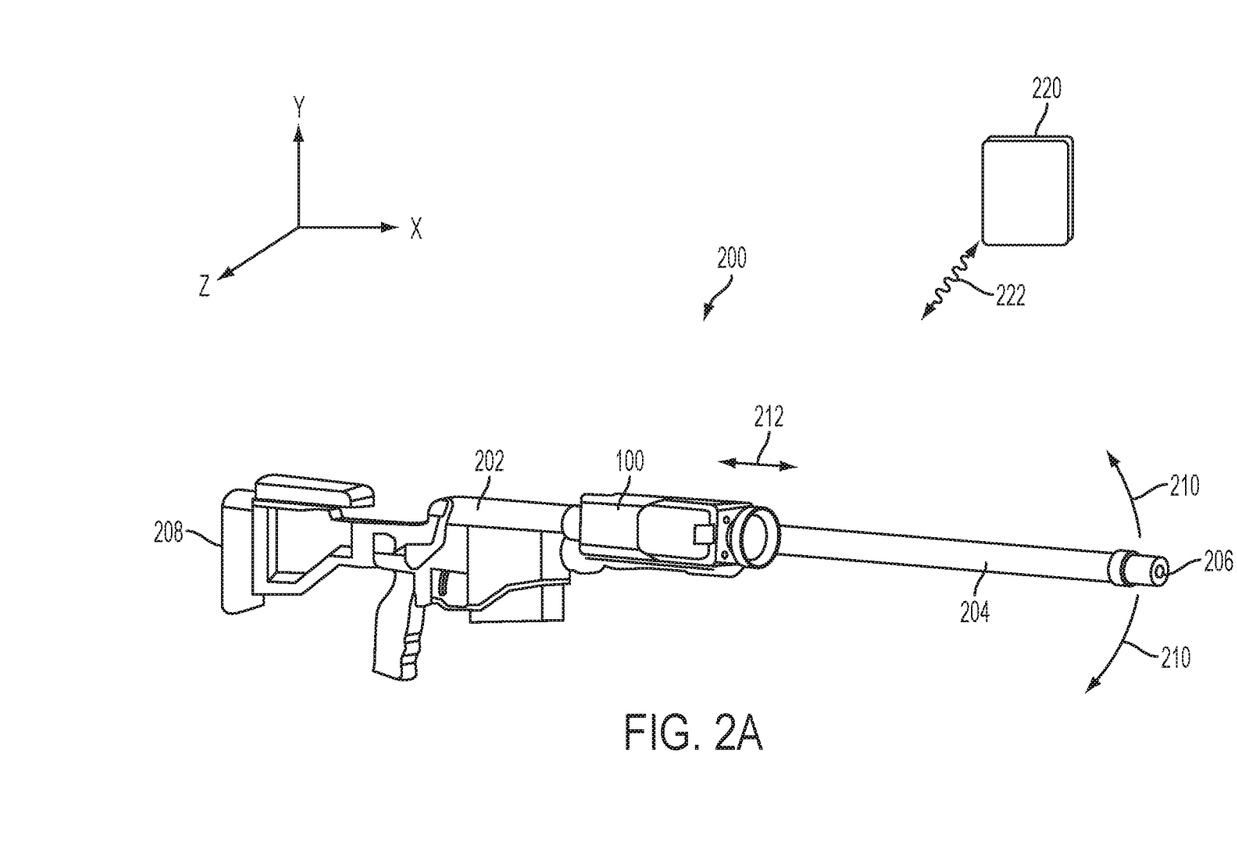
FIG. 2A shows an illustrative firearm having a camera of the type shown in FIG. 1, in accordance with an embodiment.
Figure 2B:
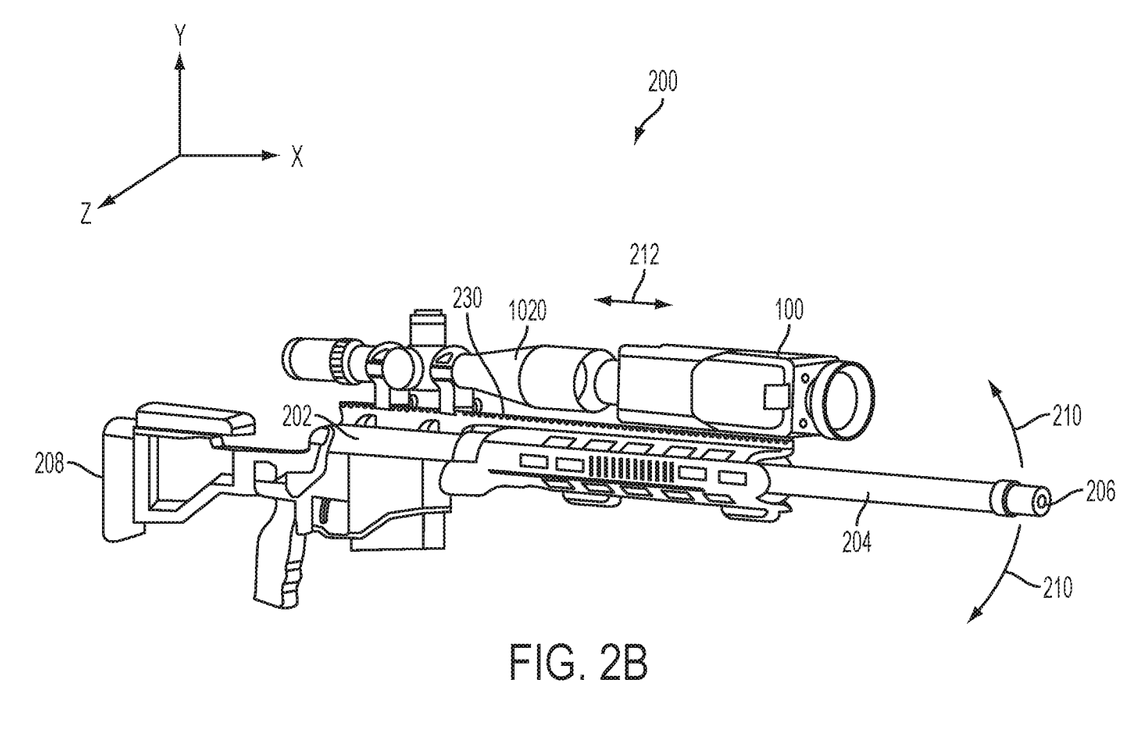
FIG. 2B shows an illustrative firearm having a camera of the type shown in FIG. 1 mounted in conjunction with a rifle scope, in accordance with an embodiment.

FIGS. 2A and 2B show examples of firearm systems having a camera of the type shown in FIG. 1.

As shown in FIG. 2A, a system such as firearm system 200 may include a firearm such as rifle 202 having a front end 206 and a rear end 208, and a camera 100 attached to the rifle, in accordance with an embodiment. Although firearm 202 is shown as a rifle, camera 100 may be mounted to any rifle, handgun or other type of firearm provided in any caliber.

Camera 100 can be mounted in line with a barrel 204 of rifle 202 so that one or more imaging components of camera 100 has a field of view that includes a scene in front of the rifle according to an embodiment. In some embodiments, camera 100 may include imaging components that are mounted at an angle with respect to barrel 204 so that other fields of view can be imaged.

Sensors such as sensors 110 of camera 100 and/or other status, position, orientation and/or motion sensors attached to rifle 202 and in communication with camera 100 may be used to monitor the status, position, orientation, and/or motion of rifle 202. For example, sensors 110 may be used to monitor the tilt of front end 206 with respect to back end 208 of rifle 202.

If rifle 202 is tilted up or down (as indicated by arrows 210), sensors 110 may provide sensor data to a processor such as processor 108 of camera 100 that indicates that front end 206 is tilted up or down with respect to back end 208. If front end 206 is tilted substantially below back end 208 (e.g., if rifle 202 is aimed at the ground for longer than a predetermined amount of time), processor 108 may power off or operate in standby mode one or more imaging modules of camera 100.

In another example, sensors 110 may be used to detect acceleration of rifle 202 in a direction parallel to barrel 204 (e.g., along the x-axis of FIG. 2A as indicated by arrows 212) that indicates a ballistic event such as the firing of a bullet from rifle 202. A ballistic event can also be identified based on the sound of the ballistic event as detected using a microphone sensor. When a ballistic event is identified, camera 100 may be used to capture, store, and/or transmit images such as still or video images for a predetermined amount of time around the ballistic event. In this way, other events associated with the ballistic event can be recorded. The recorded events can be useful in, for example, a later investigation of the effectiveness of a fired shot or of the circumstances surrounding a fired shot in, for example, a law enforcement investigation.

For example, image frames captured by imaging module 102 (e.g., thermal images captured by thermal imaging module 116 and/or visible light and/or near infrared images captured by non-thermal imaging module 118) may be continuously captured and stored in a rolling buffer to continuously record video by capturing and storing a new frame and/or storing a number N of previously captured frames. If a ballistic event is detected (e.g., a shot resulting in a jolt to the camera and/or a detectable sound), some or all of the image frames in the buffer may be transferred to other memory and stored for later image retrieval.

In some embodiments, a video link 222 (e.g., a wireless communications link such as a WiFi® link, a near field communications link or other communicative coupling) may be provided between camera 100 and an external device such as device 220. Device 220 may be a portable computing device such as a tablet computer or a smart phone or may include stationary equipment such as a base station.

In response to identifying a ballistic event, an upload to device 220 may be activated via the video link of one or more image frames from the buffer in camera 100. In this way, video data or other image data captured by camera 100 can be stored on external media such as storage in a tablet computer or smart phone that is communicatively coupled to the camera. A dedicated application running on external device 220 may receive and/or store the image frames. If desired, the video link can be continuous and ballistic event information (e.g., trigger or "shot fired" information) can be embedded in the video stream as meta-information. In some embodiments, camera 100 (or an external application on another device) can also automatically distribute one or more image frames associated with an identified ballistic event by, for example, email, multimedia messaging service (MMS), and/or other communications media or methods to a list of contacts of the operator of the firearm.

Camera 100 may be adapted to be operated based on motions of rifle 202 so that a firearm operator such as a soldier can operate the camera while leaving the soldiers hands free to operate (e.g., aim and/or fire) the firearm. For example, the firearm may be shaken, moved back and forth, moved in a unidirectional, bi-directional, or multidirectional sweep, or moved in any other predefined pattern for performing an associated operation of camera 100.

For example, if the soldier wishes to navigate through one or more camera menu options displayed on a display of camera 100, the soldier can move front end 206 quickly down and up to scroll down, quickly up and down to scroll up, or in other predefined patterns for navigating through the menu options and/or selecting operating modes (e.g., a thermal imaging mode, a non-thermal imaging mode, a high-resolution imaging mode, a standby mode, etc.) of camera 100.

In the example of FIG. 2A, camera 100 is mounted along a side portion of barrel 204. However, this is merely illustrative. In various embodiments, camera 100 may be mounted on top of rifle 202, under barrel 204, or elsewhere on rifle 202. In some embodiments, rifle 202 may include a scope in addition to camera 100. In one embodiment camera 100 may be coupled to a scope for a firearm and may cooperate with the scope to provide images of targets such as long distance targets.

FIG. 2B shows an example firearm system with a ballistic sight system that includes a rifle 202, a scope 1020, and a camera 100, in accordance with an embodiment. In the example of FIG. 2B, rifle 202 can be a sniper rifle, such as a 50 caliber Barrett M82A1 or an M107 Long Range Sniper Rifle (LRSR), for example. Although the ballistic sight system is particularly well suited for use with high power, long range rifles, the ballistic sight system can be used with any rifle, handgun or other type of firearm provided in any caliber.

In one embodiment, the scope 1020 and the camera 100 can mount in line with each other on the firearm 202. Thus, the scope 1020 can view an image provided by the camera 100, such as upon a display 114 (FIG. 1) disposed at a rear end of the camera 100.

Alternatively, the camera 100 and the scope 1020 can mount side-by-side or one atop the other as long as they are pointed in the same direction. Optics can be provided to facilitate viewing of the display 114 via the scope 1020 and/or the display 114 can be disposed at a location other than upon the camera 100. The camera 100 and the scope 1020 can mount in any desired fashion.

The scope 1020 can be any scope that is compatible for use with the rifle 202. The scope can be a unity power scope, a low power scope, or a high power scope. The camera 100 can attach to the rifle 202 in any desired manner. For example, both the scope 1020 and the camera 100 can attach to the rifle 200 via a rail 230 (e.g., a Picatinny rail).

The camera 100 can mate or mechanically attach to the scope 1020, such as to define an integrated scope/camera assembly. In this instance, the mated scope 1020 and camera 100 can attach to the rifle 202 via either the scope 1020 or the camera 100 alone.

Thus, the scope 1020 and the camera 100 can be two separate components that are not attached directly to one another. The scope 1020 and the camera 100 can each attach separately to the rifle 202.

The camera 100 can be used with passive or active illumination. The camera can be used with natural illumination such as sunlight, starlight, or moonlight. The camera can be used with artificial illumination, such illumination provided by an infrared light source.

The camera 100 can have a normal mode in which the image is fixed and can have a ballistic mode in which the image moves to keep a bullet impact point, e.g., a target, approximately centered within a view of the scope 1020.

Thus, in the ballistic mode the image can be moved to compensate for bullet drop and windage, rather than moving a scope reticule. The camera 100 can be configured to be switched from the normal mode to the ballistic mode, such as when the scope reticule cannot move sufficiently to place a crosshair of the scope reticule on the target due to the amount of windage and/or bullet drop compensation required at a longer shooting distance.

Figure 3:
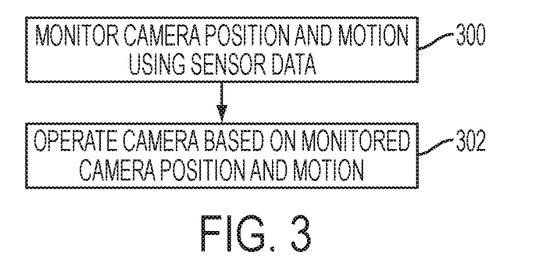
FIG. 3 shows a flowchart of an illustrative process for controlling camera operations for a camera using one or more sensors, in accordance with an embodiment.

FIG. 3 illustrates a flowchart of a process for operating a camera using sensor data in accordance with an embodiment of the disclosure.

At block 300, the position and motion and, if desired, orientation, of a camera may be monitored. Monitoring the position, motion, and orientation of the camera may include gathering sensor data (e.g., accelerometer data, gyroscope data, compass data, GPS data, etc.) using sensors in the camera or in communication with the camera, and determining the position, motion, and orientation of the camera using the sensor data.

At block 302, the camera may be operated based on the monitored position and motion and, if desired orientation of the camera. Operating the camera based on a determined position, motion, and/or orientation may include changing the power status of the camera based on the orientation of the camera, changing an operational mode of the camera based on a motion of the camera, and/or capturing images in response to detected motion of the camera.

Figure 4:
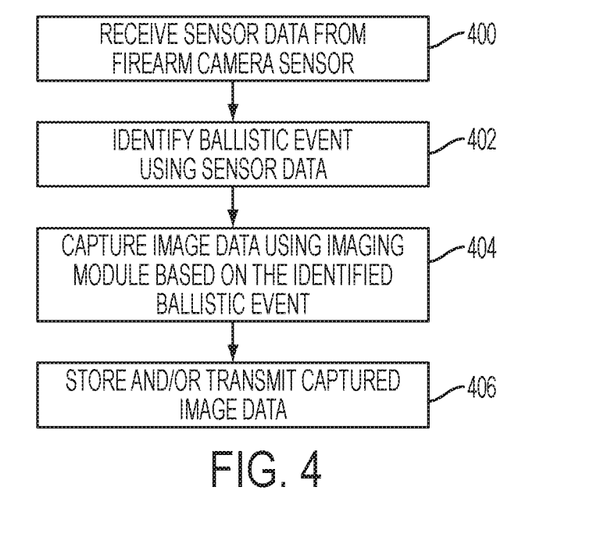
FIG. 4 shows a flowchart of an illustrative process for controlling camera operations for a camera on a firearm based on a detection of a ballistic event using one or more sensors, in accordance with an embodiment.
Figure 5:
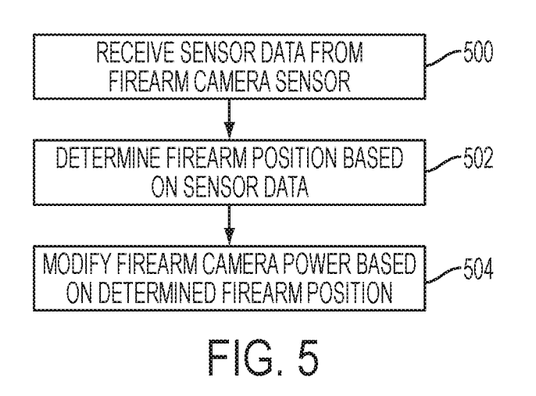
FIG. 5 shows a flowchart of an illustrative process for controlling camera operations for a camera on a firearm based on a determination of a firearm position using one or more sensors, in accordance with an embodiment.
Figure 6:
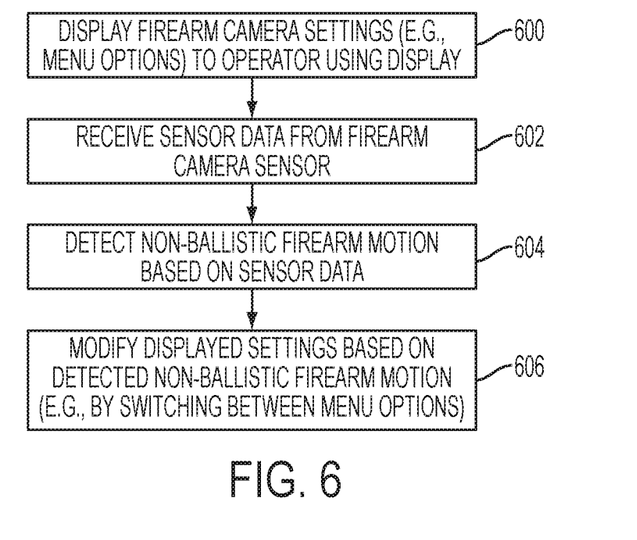
FIG. 6 shows a flowchart of an illustrative process for operating a camera on a firearm based on a detection of a non-ballistic movement using one or more firearms, in accordance with an embodiment.

A camera that is operated using the processes described above in connection with blocks 300 and 302 may be formed as part of a firearm system such as firearm system 200 of FIG. 2 or 3 (as examples). FIGS. 4, 5, and 6 illustrate flowcharts of exemplary processes for operating a firearm system having a firearm, a firearm camera, and one or more sensors associated with the firearm camera.

FIG. 4 illustrates a flow chart of an exemplary process for operating a firearm camera based on a ballistic event.

At block 400, sensor data may be received (e.g., by a processor in a firearm camera or another processor in a firearm system having a camera). The sensor data may include IMU data, accelerometer data, gyroscope data, GPS data, compass data, position data, orientation data, and/or motion data (as examples).

At block 402, a ballistic event such as the firing of a bullet or other ammunition from the firearm may be identified using the sensor data. For example, the sensor data may include accelerometer data that indicates rapid acceleration and/or recoil of the firearm and thereby indicate that a bullet has been fired from the firearm. As another example, the sensor data may include microphone data that indicates that the sound of a bullet being fired from the firearm has been detected.

At block 404, image data may be captured using an imaging module (e.g., infrared image data, visible light image data, thermal image data, and/or non-thermal image data) based on the identified ballistic event. For example, image detectors in the imaging module may begin capturing still and/or video image data in response to the identification of a ballistic event and/or image data that has been continuously captured and temporarily stored in a rolling image frame buffer in a predetermined number of image frames captured before, during, and/or after the identified ballistic event may be determined to be ballistic event image frames. Additional image frames may be captured, for example, for a predetermined amount of time following each identified ballistic event.

At step 406, the captured image data may be stored and/or transmitted to another device. For example, the temporarily stored image frames in the rolling image frame buffer that have been determined to be ballistic event images and additional captured images may be transferred to other memory in the camera and/or transmitted to a device associated with the camera and/or to one or more operator contacts. The captured image data may also be displayed on a display associated with the camera. In this way, images may be recorded of the surroundings of the firearm at the time of any ballistic event in a hands free image capture operation. For example, a hunter may be able to view video of a kill shot that has been automatically captured, stored, and/or transmitted by the firearm camera after the kill shot has been fired.

FIG. 5 illustrates a flow chart of an exemplary process for operating a firearm camera based on a determined position of the firearm.

At block 500, sensor data may be received (e.g., by a processor in a firearm camera of another processor in a firearm system having a camera. The sensor data may include IMU data, accelerometer data, gyroscope data, GPS data, compass data, position data, orientation data, and/or motion data (as examples).

At block 502, the position and/or orientation of the firearm may be determined based on the sensor data. For example, the sensor data may include gyroscope data that indicates that the firearm is aimed downward toward the ground and is not being aimed at a target. For example, if a soldier is walking with a rifle in a non-combat situation, the downward facing position of the rifle and the motion of the rifle due to the soldier's gait may be detected. In another example, if a soldier is aiming the rifle at a target, a horizontal or other position of the rifle and a steady position or motion of the rifle due to the aiming of the rifle at a target may be detected.

At block 504, the power of the firearm camera may be modified based on the determined firearm position. For example, if it is determined that the firearm is in a downward facing unaimed position, the firearm camera may be powered off or operated in a low power standby mode of operation. In another example, if it is determined that the rifle is in an aimed position, the firearm camera may be powered on or operated in an image capture mode of operation. In this way, the power load on the firearm camera battery may be reduced.

FIG. 6 illustrates a flow chart of an exemplary process for operating a firearm camera based on a non-ballistic motion of the firearm.

At block 600, one or more settings such as settings for the firearm camera (e.g., firearm camera settings) may be displayed to a firearm operator on display such as a display of the firearm camera. The displayed settings may include, for example, menu options for the camera. The menu options may include image capture mode options (e.g., a thermal imaging mode option or a non-thermal imaging mode option), image processing mode options, image display mode options, camera power options, or other camera options.

At block 602, sensor data may be received (e.g., by a processor in a firearm camera of another processor in a firearm system having a camera). The sensor data may include IMU data, accelerometer data, gyroscope data, GPS data, compass data, position data, orientation data, and/or motion data (as examples).

At block 604, a non-ballistic motion of the firearm may be detected based on the sensor data. For example, the sensor data may indicate that a rifle has been shaken up and down, shaken left and right, otherwise shaken, moved in a circular motion, moved in a diagonal motion with respect to the orientation of the display or otherwise moved by the operator of the rifle.

At block 606, the displayed settings may be modified based on the detected non-ballistic firearm motion (e.g., by switching or otherwise navigating between or among menu options). In this way, a user of a firearm may be provided with the ability to operate a firearm camera without removing their hands from firing and/or aiming positions on the firearm.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device comprising:
    a camera comprising an imaging module and configured to couple to a firearm;
    at least one sensor within the camera and configured to provide sensor data associated with a position and a motion of the firearm; and
    a processor within the camera and coupled to the at least one sensor and configured to power on, power off, and operate the imaging module in response to the sensor data associated with the position and the motion of the firearm received from the at least one sensor;
    wherein the processor is configured to power off the imaging module in response to the sensor data associated with a detected downward facing position of the firearm for a pre-determined period of time.

2. The device of claim 1, wherein the imaging module comprises a thermal imaging module, wherein the device further comprises the firearm, wherein the camera is mounted to the firearm, and wherein the processor is configured to operate the imaging module by changing a power status, changing an operational mode, and capturing images in response to the sensor data associated with the position and the motion of the firearm.

3. The device of claim 2, wherein the imaging module further comprises a non-thermal imaging module.

4. The device of claim 3, further comprising a display coupled to the camera, wherein the processor is further configured to select a thermal imaging operating mode, a non-thermal imaging operating mode, and/or a high resolution imaging operating mode from a list on the display in response to a detected motion of the firearm.

5. The device of claim 1, wherein the at least one sensor comprises an accelerometer and a gyroscope configured to provide the sensor data used to perform associated operation of the imaging module, and wherein the processor is configured to scroll among a plurality of camera settings in response to sensor data associated with a predefined pattern of motions and/or positions of the firearm.

6. The device of claim 1, wherein the processor is configured to operate the imaging module in response to the sensor data associated with the position and the motion of the firearm by operating the imaging module to capture image data in response to a detected acceleration of the firearm.

7. The device of claim 1, wherein the processor is configured to place in standby mode the imaging module in response to the sensor data associated with a detected downward facing position of the firearm for a different pre-determined period of time.

8. A system comprising:
a firearm;
a camera comprising an imaging module mounted to the firearm;
at least one sensor within the camera and configured to provide sensor data associated with at least one of a position, an orientation, and a motion of the firearm; and
a processor within the camera and coupled to the at least one sensor and configured to receive the sensor data associated with at least one of the position, the orientation, and the motion of the firearm and power on, power off, and operate the camera to change an operational mode, and capture images in response to the sensor data associated with at least one of the position, the orientation, and the motion of the firearm;
wherein the processor is configured to determine the position of the firearm using the sensor data, and wherein the processor is configured to power off the camera in response to the sensor data associated with a detected downward facing position of the firearm for a pre-determined period of time.

9. The system of claim 8, wherein the processor is configured to identify a ballistic event using the sensor data and to operate the camera to capture image data for a predetermined amount of time in response to the identified ballistic event, and further comprising a wireless communication link between the camera and an external device, wherein the camera is configured to wirelessly communicate the captured image data to the external device.

10. The system of claim 9, wherein the ballistic event comprises an event associated with a fired bullet from the firearm, wherein the event is at least one of an acceleration of the firearm or a sound from the firearm, and wherein the system further comprises a microphone configured to provide sensor data associated with the sound from the firearm.

11. The system of claim 8, wherein the processor is configured to determine the position of the firearm using the sensor data, and wherein the processor is configured to place in standby mode the camera in response to the sensor data associated with a detected downward facing position of the firearm for a different pre-determined period of time.

12. The system of claim 8, wherein the camera comprises a thermal imaging module and a non-thermal imaging module, and wherein the processor is configured to operate the camera in a thermal imaging operating mode, a non-thermal imaging operating mode, and/or a high resolution imaging operating mode in response to the sensor data associated with at least one of the position, the orientation, and the motion of the firearm.

13. The system of claim 8, further comprising a firearm scope mounted to the firearm and aligned with the camera, wherein the firearm scope is configured as a unity power, a low power, or a high power scope, and wherein the camera is configured to maintain a camera image approximately centered within a view of the firearm scope.

14. A method comprising:
monitoring a position, an orientation, and/or a motion of a firearm by receiving sensor data from at least one sensor;
powering on, powering off, and operating a camera mounted to the firearm in response to the sensor data from the at least one sensor associated with the position, the orientation, and/or the motion of the firearm; and
modifying an operating status of the camera to power off the camera if the firearm is facing downward for a pre-determined period of time based on the monitoring.

15. The method of claim 14, further comprising detecting a ballistic event based on the monitoring, and wherein the at least one sensor comprises an accelerometer, a gyroscope, and/or a microphone.

16. The method of claim 15, wherein the operating comprises:
capturing image data with the camera and wirelessly communicating the captured image data to an external device in response to the detecting; and
scrolling among a plurality of camera settings in response to sensor data associated with a predefined pattern of motions and/or positions of the firearm.

17. The method of claim 15, wherein the detecting comprises detecting a firing of a bullet from the firearm by detecting at least one of an acceleration of the firearm or a sound from the firearm, and wherein the operating comprises operating the camera to capture images in response to the sensor data from the at least one sensor associated with the acceleration or the sound.

18. The method of claim 14, wherein the modifying the operating status further comprises powering on, changing an operational mode, and/or capturing images based on the monitoring.

19. The method of claim 14, wherein the modifying comprises placing in standby mode the camera in response to the monitoring if the firearm is facing downward for a different pre-determined period of time.

20. The method of claim 14, further comprising:
displaying a camera setting comprising a thermal imaging operating mode, a non-thermal imaging operating mode, and/or a high resolution imaging operating mode on a display of the camera;
detecting a non-ballistic motion of the firearm; and
selecting the thermal imaging operating mode, the non-thermal imaging operating mode, and/or the high resolution imaging operating mode responsive to the detecting.

* * * * *